United States Patent

[11] 3,557,894

| [72] | Inventors | Donald E. Hanley<br>1900 Reynolds St., Butte, Mont. 59701<br>Charles L. Hogensen, 1320 W. Fifth St.,<br>Anaconda, Mont. 59711 |
|---|---|---|
| [21] | Appl. No. | 816,144 |
| [22] | Filed | Mar. 13, 1969 |
| [45] | Patented | Jan. 26, 1971<br>Substitute for application Ser. No. 430,915,<br>Feb. 8, 1965, now abandoned. This<br>application Mar. 13, 1969, Ser. No.<br>816,144 |

[54] RESILIENT FRAME FOR RACING GOCART
14 Claims, 6 Drawing Figs.
[52] U.S. Cl.................................................. 180/64,
280/5
[51] Int. Cl.................................................. B60k 5/00
[50] Field of Search.......................................... 280/87,
106, 106.5, 5A; 180/64; 296/64, 65

[56] References Cited
UNITED STATES PATENTS
| 2,857,010 | 10/1958 | Leroy............................ | 180/64X |
| 2,919,139 | 12/1959 | Rupp.............................. | 280/106 |
| 2,988,162 | 6/1961 | Hansen.......................... | 180/64X |
| 3,022,846 | 2/1962 | Thompson..................... | (280/269UX) |

*Primary Examiner*—Kenneth H. Betts
*Attorney*—Alexander & Dowell

ABSTRACT: The gocart chassis has a front wheeled axle to which the front ends of the legs of a U-shaped main frame are welded. A rear wheeled axle disposed below the rear end of the main frame is connected to the main frame by means which prevent metal-to-metal contact so as to eliminate shock and vibration, the connecting means also forming a mount for a motor to rotate the rear axle. A U-shaped seat frame of shorter length than the main frame has the front ends of its legs also welded to the front axle, the seat frame lying for the most part below and within the width of and free from touching the main frame. The rear end of the seat frame is connected to the overlying legs of the main frame by means which prevent metal-to-metal contact so as to eliminate shock and vibration. A combined seat and gas tank is secured to the seat frame free from contact with the main frame thereby allowing full flexibility of the main frame. Steering means for the front wheels is mounted on the seat frame and front axle in advance of the seat.

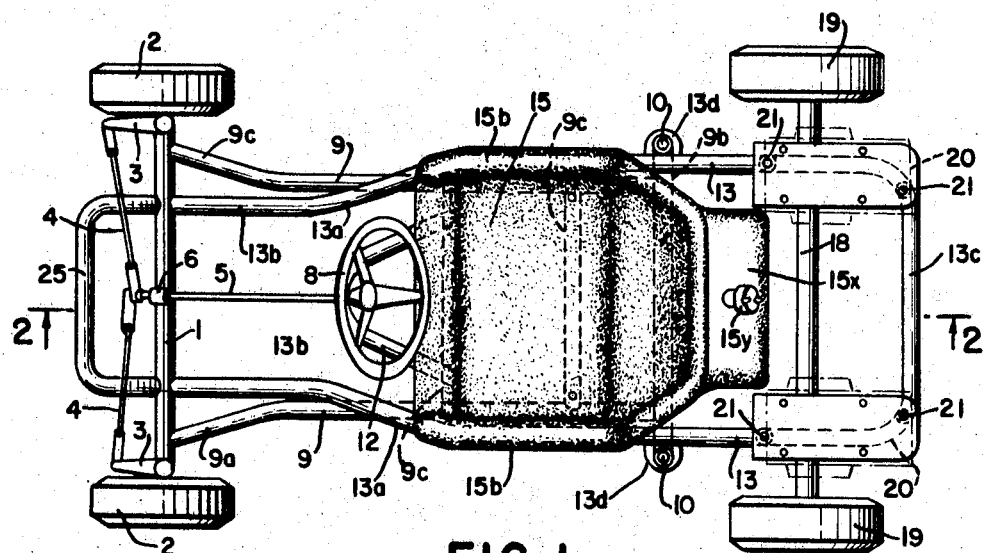
FIG.1.
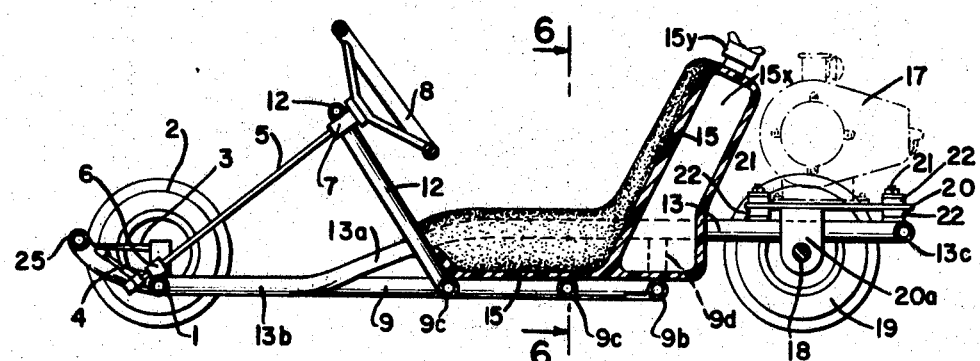
FIG.2.
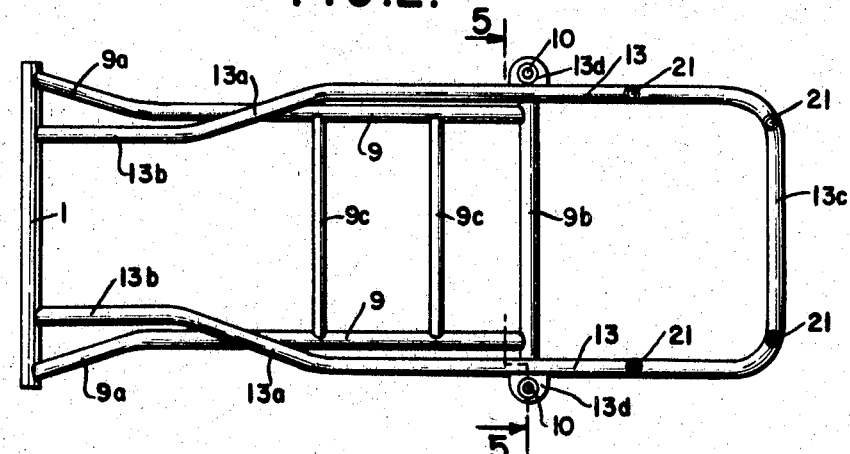
FIG.3.
INVENTORS
Donald E. Hanley &
Charles L. Hogenson
ATTORNEY PATENTED JAN 26 1971 3,557,894
SHEET 2 OF 2
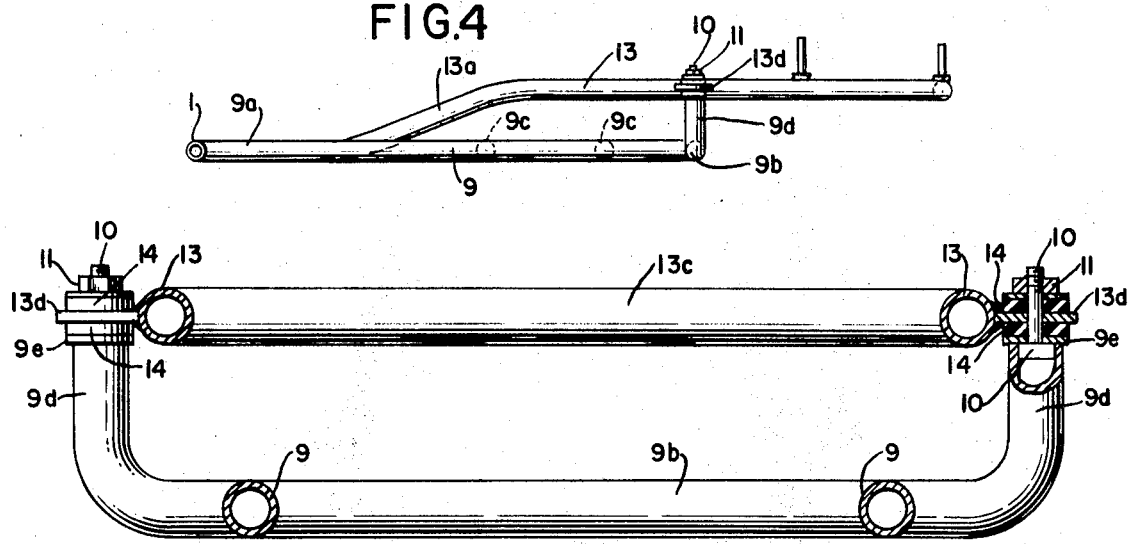
FIG.4
FIG.5.
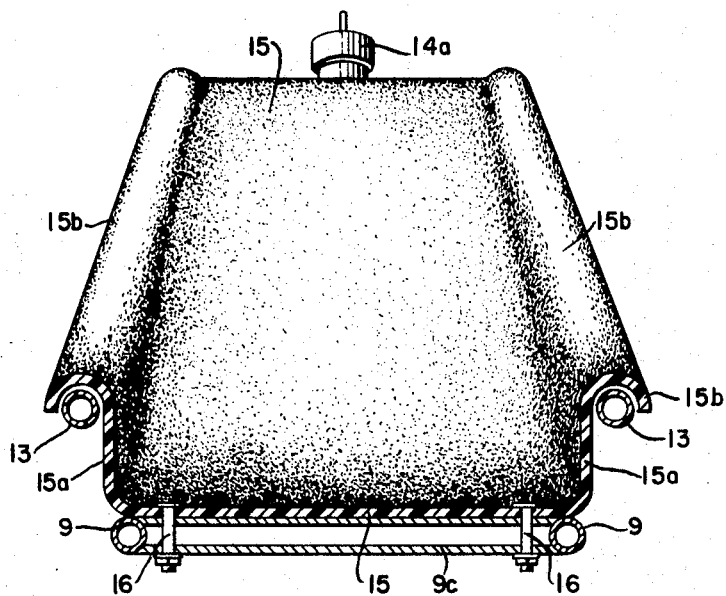
FIG.6.
INVENTORS
Donald E. Hanley &
Charles L. Hogenson
BY *Alexander␣Nowell*
ATTORNEY

RESILIENT FRAME FOR RACING GOCART

DESCRIPTION OF INVENTION

This application is a substitute for our Ser. No. 430,915, filed Feb. 8, 1965, now abandoned.

This invention relates to racing gocarts, and the principal object thereof is to provide a gocart of the above type having a seat frame and a main frame extending from the front axle, which frames are completely independent of each other to give the gocart flexibility in negotiating turns, the seat frame carrying a combined seat and gas tank formed as one unit, and being separate from the main frame and so mounted that all vibration will be reduced. In gocarts now on the market, the seat frame is usually welded to the main frame, but our invention has been tested and gocart enthusiasts report that same is an invention of substantial value.

More specifically the objects of our present invention are to provide a gocart having two frames completely independent of each other and in which the main frame and the seat frame are welded to the front axle but never touch each other, the seat frame being suspended from the main frame by rubber bushings which eliminate shock and vibration, this arrangement allowing full flexibility of the main frame and distributing the weight evenly on all four wheels, and allowing the gocart to round a tight corner without sliding.

A further object of the invention is to provide a gocart of the above type in which the rear engine mounts are separate from and do not directly touch the main frame, same being mounted in rubber bushings on bolts which are welded to the main frame, the rubber bushings eliminating shock and vibration.

A further object is to provide a combined seat and gas tank made of fibre glass as a one-unit assembly, the gas tank being disposed on the back of the seat. This unit being mounted on the seat frame never directly touches the main frame, and thus allows full flexibility of the main frame.

Other minor objects will be hereinafter set forth.

We will explain the invention with reference to the accompanying drawings which illustrate one practical embodiment thereof, to enable others to adopt and use the same, and will summarize in the claims the novel features of construction, and novel combinations of parts, for which protection is desired.

In said drawings:

FIG. 1 is a top plan view of our novel gocart, with engine and controls therefor removed, but showing the unitary seat and gas tank and the steering post mounted on the seat frame.

FIG. 2 is a longitudinal section on the line 2—2, FIG. 1.

FIG. 3 is a top plan view of the main frame and seat frame both welded to the front axle of the gocart.

FIG. 4 is a side elevation of the parts shown in FIG. 3.

FIG. 5 is an enlarged transverse section on the line 5—5, FIG. 3.

FIG. 6 is an enlarged transverse section on the line 6—6, FIG. 2.

As shown in the drawings, our novel gocart comprises a front tubular axle 1 having front steering wheels 2 at its ends journaled in steering arms 3 in the usual manner, the outer ends of which arms 3 are connected by links 4 to the lower end of a steering rod 5 journaled in a lower bearing 6 on front axle 1, the upper end of the steering rod 5 carrying the steering wheel 8 and being supported in a bearing 7, FIG. 2, carried by a bracket 12 extending from the seat frame 9, as hereinafter described.

The seat frame is preferably formed of tubing and is substantially U-shaped as shown in FIG. 5, and consists of spaced horizontally disposed side members 9 having their forward ends outwardly flared as at 9a and welded to the tubular front axle 1 at points adjacent the front wheels 2. The rear ends of the side members 9 are welded to a tubular crossmember 9b as shown in FIG. 5, the member 9b extending laterally beyond the side members 9, as shown in FIG. 5, for the purpose hereinafter described.

Between the crossmember 9b and the front axle 1 are a pair of spaced intermediate tubular crossmembers 9c, the ends of which are welded to the spaced longitudinal side members 9, as shown in FIG. 5. Thus the members 9, 9b, 9c are welded together to form a rigid seat frame for the gocart, the rear end of the seat frame 9, 9b, 9c being supported by rubber bushings from the main frame as hereinafter described, which main frame not only supports the seat frame but also carries the rear axle, rear wheels and engine of the gocart hereinafter described.

Upon the seat frame 9, 9b, 9c, as shown in FIGS. 1, 2 and 6, is a combined seat and gas tank preferably molded of fibre glass in one unit, the gas tank 15x being mounted on the back of the seat 15, the sides of which seat 15 are bent upwardly as at 15a and curved over the arms 13 of the main frame as shown at 15b. The main portion of the seat 15 rests upon the crossmembers 9b and 9c of the seat frame and is secured thereto by bolts 16, FIG. 6, but may be secured in any other desired manner. The gas tank 15x is preferably provided with a filling cap 15y disposed at the top of the tank 15x in rear of the back of the seat 15, and a tube (not shown) from the gas tank 15x leads directly to the carburetor of the engine 17 shown in dot-and-dash lines in FIG. 2, and which is supported on the rear end of the main frame, as hereinafter described.

As shown in FIGS. 2 and 5, the outer ends of the crossmember 9b are upwardly turned as at 9d and terminate somewhat above the main portion of the crossmember 9b, as shown in FIG. 5, the outer ends of the upturned portions 9b being closed by circular plates 9e which are perforated at their centers and are engaged by the heads 10a of upstanding bolts 10 which are threaded and carry nuts 11 as shown in FIG. 5.

As shown in FIGS. 1 and 2, the bearing 7 for the upper of the steering rod 5 is supported by a bracket consisting of a tubular inclined inverted U-frame 12, the lower ends of which are welded to the forward crossmember 9c of the seat frame.

The main frame as shown in FIGS. 1—3 is also of substantial U-shape and is formed of tubing, the legs 13 of the main frame being spaced apart throughout the major portion of their length a distance greater than the spacing between the frame members 9 of the seat frame, as shown in FIG. 5, and the forward portions of the legs 13 converging as at 13a to a spacing somewhat less than the spacing between the frame members 9 of the seat frame, and then continuing as at 13b to the front axle 1 where the front ends thereof are welded to the front axle 1 at points spaced within the welded portions 9a of the seat frame.

As shown in FIG. 2, the front portions 13b of the main frame lie substantially within the plane of the front ends of the legs 9 of the seat frame but the converging portions 13a are inclined slightly upwardly as shown in FIG. 2 so as to lie above the plane of the frame members 9 of the seat frame, and such raised portions continue to the rear ends of the legs 13 which are joined as at 13c, which base portion 13c is spaced considerably rearwardly of the rear crossmember 9b of the seat frame, for the purpose hereinafter described.

Thus the main frame 13 does not touch the seat frame at any point except where the two frames are connected together through rubber bushings. As shown the arms 13 of the main frame have welded thereto ears or plates 13d, FIGS. 1 and 5, which are perforated and disposed opposite the upstanding bolts 10 carried by the upstanding portions 9d of the seat frame 9, the perforations in the ears or plates 13d receiving the bolts 10 with rubber washers 14 interposed between the heads 9e and nuts 11 on the bolts 10 to prevent metal-to-metal contact between the main and seat frames, the rubber bushings 14 absorbing any vibrations and reducing shock between the two frames. In this manner the rear end of the seat frame is suspended from the main frame intermediate the ends of the main frame, and the two frames are completely independent of each other and do not touch at any other point except at the bushings 14, thereby eliminating shock and vibration and allowing for full flexibility of the main frame.

The rear axle 18 is driven by the engine 17 in any conventional manner and carries at its ends the rear wheels 19 which rotate with the axle. The means for mounting the rear axle 18 on the main frame consists of a pair of plates 20 which have depending ears 20a, FIG. 2, at each side which extend downwardly and have holes therein receiving the rear axle 18, collars or shoulders being provided on the axle 18 to prevent axial movement of the rear axle 18 with respect to the mounting plates 20, which latter are connected to the rear corners of the main frame through rubber bushings in a manner similar to the assembly of the bushings 14 previously described. As shown, a pair of upright bolts 21 are disposed on frames 13 adjacent the rear corners of the main frame preferably with the heads of the bolts welded to the members 13 of the main frame, and the mounting plates 20 are provided with holes therein receiving the upright bolts 21, rubber bushings 22 being interposed between the top and bottom of the mounting plates 20 and the heads of the bolts 21 and nuts on the bolts 21 in a manner similar to the mounting of the bushings 14 on the bolts 10 previously disclosed.

Thus the engine mounting plates 20 are separate from the main frame 9 and do not touch the main frame. They are mounted between rubber bushings 22, which bushings are mounted on bolts 21 welded to the main frame, each plate 20 being held by two bolts 21 and bushings 22. By having the plates 20 mounted in rubber bushings shock and vibration are eliminated. The engine 17 is bolted to the mounting plates 20 as indicated in FIGS. 1 and 2.

Thus the main frame and seat frame are both welded to the front axle but never touch each other. The seat frame 9 is suspended from the main frame by rubber bushings 14 in plates 13d welded to the main frame 13, which bushings eliminate shock and vibration. This arrangement allows flexibility of the main frame and distributes the weight evenly on all four wheels, and also allows the gocart to round a tight corner without sliding or breaking loose. The rear axle and engine mounts 20 are separate from the main frame and do not touch the main frame except through the resilient bushings 22 which are mounted on the bolts 21 welded to the main frame. The use of rubber bushings 22 eliminates shock and vibration. The seat and gas tank are made of fibre glass in a one-unit assembly, the gas tank 15x being on the back of the seat 15. This seat unit 15 is mounted on the seat frame 9 but never touches the main frame 13 and thus allows full flexibility of the main frame.

A footrest for the driver is provided at the front of the gocart consisting of a U-shaped frame 25 of tubing which is welded to the front axle 1 at points opposite the portions 13b of the main frame, the footrest 25 being preferably curved upwardly as shown in FIG. 2 for convenience of the driver and acting as a guard or bumper for the front end of the gocart, the footrest 25 extending beyond the front wheels 2 of the gocart.

We do not limit our invention to the exact form shown in the drawings, for obviously changes may be made therein within the scope of the claims.

We claim:

1. A racing gocart chassis consisting of a front wheeled axle; a U-shaped main frame having the front ends of its legs welded to the front axle; a rear wheeled axle disposed below the rear end of the main frame; means connecting the rear axle to the main frame while preventing metal-to-metal contact therewith so as to eliminate shock and vibration; said means also forming a mount for a source of power to rotate said rear axle; a U-shaped seat frame of shorter length than the main frame and having the front ends of its legs welded to the front axle; said seat frame lying for the most part below and within the width of and free from contact with the main frame; other means connecting the rear end of the seat frame to the overlying legs of the main frame while preventing metal-to-metal contact therewith so as to eliminate shock and vibration; a seat secured upon the seat frame free from contact with the main frame, thereby allowing full flexibility of the main frame; and steering means mounted on the seat frame in advance of the seat.

2. In a gocart chassis as set forth in claim 1, said first means comprising horizontal mounting plates for the source of power adjacent the rear corners of the main frame and disposed above said frame, said plates having depending journal portions for said rear axle, a plurality of upstanding bolts on the main frame extending through holes in the respective plates and having nuts on their upper ends; and rubber bushings on said bolts disposed above and below the plates and engaging the main frame and nuts respectively.

3. In a gocart chassis as set forth in claim 1, said other means comprising upstanding bolts at the rear corners of the seat frame extending through perforated lugs on the legs of the main frame and having nuts on their upper ends; and rubber bushings on said bolts disposed above and below the lugs and engaging the seat frame and nuts respectively.

4. In a gocart chassis as set forth in claim 1, said seat being formed of fibre glass, and the sides of the seat being turned upwardly and rounded over and above the legs of the main frame to avoid contact therewith.

5. In a gocart chassis as set forth in claim 1, said steering means comprising a steering rod having its lower end journaled on the front axle and having its upper end journaled on a bracket welded to the seat frame and carrying a steering wheel.

6. In a gocart chassis as set forth in claim 1, a combined footrest and bumper welded to the front axle and forming a continuation of the main frame, said footrest being curved upwardly and extending forwardly beyond the front wheels.

7. In a gocart chassis as set forth in claim 1, the legs of the seat frame lying wholly in the horizontal plane of the front axle; and the front ends of the legs of the main frame lying between and in the plane of the seat frame and then flaring outwardly and rising above the legs of the seat frame in advance of the seat and continuing rearwardly in said elevated horizontal plane to the rear end of the main frame.

8. A racing gocart chassis consisting of a front wheeled axle; a U-shaped main frame having the front ends of its legs welded to the front axle; a rear wheeled axle disposed below the rear end of the main frame; means connecting the rear axle to the main frame while preventing metal-to-metal contact therewith so as to eliminate shock and vibration, said means also forming a mount for a source of power to rotate said rear axle; a U-shaped seat frame of shorter length than the main frame and having the front ends of its legs welded to the front axle, said seat frame lying for the most part below and within the width of and free from contact with the main frame; other means connecting the rear end of the seat frame to the overlying legs of the main frame while preventing metal-to-metal contact therewith so as to eliminate shock and vibration; a combined seat and gas tank secured to the seat frame free from contact with the main frame, thereby allowing full flexibility of the main frame; and steering means for the front wheels mounted on the seat frame and front axle in advance of the seat.

9. In a gocart chassis as set forth in claim 8, said first means comprising horizontal mounting plates for the source of power adjacent the rear corners of the main frame and disposed above said frame, said plates having depending journal portions for said rear axle, a plurality of upstanding bolts on the main frame extending through holes in the respective plates and having nuts on their upper ends; and rubber bushings on said bolts disposed above and below the plates and engaging the main frame and nuts respectively; said plates having other holes therein for securing the source of power thereon.

10. In a gocart chassis as set forth in claim 8, said other means comprising upstanding bolts at the rear corners of the seat frame extending through perforated lugs on the legs of the main frame and having nuts on their upper ends; and rubber bushings on said bolts disposed above and below the lugs and engaging the seat frame and nuts respectively.

11. In a gocart chassis as set forth in claim 8, said combined seat and gas tank being formed of fibre glass, the gas tank being integral with the back of the seat and the sides of the seat being turned upwardly and rounded over and above the legs of the main frame to avoid contact therewith.

12. In a gocart chassis as set forth in claim 8, said steering means comprising a steering rod having its lower end journaled on the front axle and having its upper end journaled on an inverted U-shaped bracket welded to the seat frame and carrying a steering wheel.

13. In a gocart chassis as set forth in claim 8, a U-shaped combined footrest and bumper welded to the front axle and forming a continuation of the main frame, said footrest being curved upwardly and extending forwardly beyond the front wheels.

14. In a gocart chassis as set forth in claim 8, the legs of the seat frame lying wholly in the horizontal plane of the front axle; and the front ends of the legs of the main frame lying between and in the plane of the seat frame and then flaring outwardly and rising above the legs of the seat frame in advance of the seat and continuing rearwardly in said elevated horizontal plane to the rear end of the main frame.